United States Patent [19]
Johnson et al.

[11] Patent Number: 5,920,716
[45] Date of Patent: *Jul. 6, 1999

[54] COMPILING A PREDICATED CODE WITH DIRECT ANALYSIS OF THE PREDICATED CODE

[75] Inventors: Richard C. Johnson, Cuptertino; Michael S. Schlansker, Los Altos, both of Calif.

[73] Assignee: Hewlett-Packard Company, Palo Alto, Calif.

[*] Notice: This patent is subject to a terminal disclaimer.

[21] Appl. No.: 08/756,423

[22] Filed: Nov. 26, 1996

[51] Int. Cl.$^6$ .................................................. G06F 9/45
[52] U.S. Cl. ........................ 395/701; 395/704; 395/705; 395/708
[58] Field of Search ........................ 395/701, 704, 395/705, 706, 708, 709

[56] References Cited

U.S. PATENT DOCUMENTS

| | | | |
|---|---|---|---|
| 5,293,631 | 3/1994 | Rau et al. ................................. | 395/707 |
| 5,367,651 | 11/1994 | Smith et al. ............................. | 395/700 |
| 5,414,855 | 5/1995 | West ........................................ | 395/708 |
| 5,442,790 | 8/1995 | Nosenchuck ............................. | 395/707 |
| 5,581,762 | 12/1996 | Hayashi et al. .......................... | 395/709 |
| 5,627,981 | 5/1997 | Adler et al. .............................. | 395/582 |
| 5,664,135 | 9/1997 | Schlansker et al. ..................... | 395/377 |
| 5,694,539 | 12/1997 | Haley et al. ........................ | 395/183.14 |
| 5,748,936 | 5/1998 | Karp et al. ............................... | 395/394 |
| 5,768,592 | 6/1998 | Chang ...................................... | 395/704 |
| 5,802,373 | 9/1998 | Yates et al. .............................. | 395/705 |

OTHER PUBLICATIONS

Wen–Mei W. Hwu, Richard E. Hank, David M. Gallager, Scott A. Mahlke, Daniel M. Lavery, Grant E. Haab, John C. Gyllenhaal, and David I. August, "Complier Technology for Future Microprocessors", Proceediings of the IEEE, vol. 83, No. 12, Dec. 1995, pp. 1625–1640.

Alexandre E. Eichenberger and Edward S. Davidson, "Register Allocation for Predicated Code", Proceedings of the 28th Annual International Symposium on Microarchitecture, Nov. 29–Dec. 1, 1995, Ann Harbor, Michigan, pp. 180–191.

David Chu Lin, "Compiler Support for Predicated Exewcution in Supercalar Processors", Thesis, University of Illinois at Urabana–Champaign, 1992, pp. iiii–58.

"Characterizing the Impact of Predicated Execution on Branch Prediction", Scott A. Mahlke et al., ACM, Nov. 1994.

*Primary Examiner*—Tariq R. Hafiz
*Assistant Examiner*—Antony Nguyen-Ba
*Attorney, Agent, or Firm*—Thomas X. Li

[57] ABSTRACT

A compiler of a predicated code includes a data flow analysis system that manipulates and queries predicate expressions of the predicated code to (1) analyze data flow properties of the predicated code and (2) annotate the predicated code with the analyzed data flow properties. A predicate-sensitive analyzer for a compiler that compiles a predicated code is also described. The predicate-sensitive analyzer includes a scanner that determines local predicate relations of the predicated code. The analyzer also includes a builder that determines global predicate relations of the predicated code. A predicate query system is provided to store the local and global predicate relations of the predicated code and to answer queries about the local and global predicate relations. A method of compiling the predicated code is also described.

20 Claims, 27 Drawing Sheets

| | OP UNIT 1 | OP UNIT 2 | OP UNIT 3 | OP UNIT 4 |
|---|---|---|---|---|
| CYCLE 1 | p,q = cmpp.uc.un (a<b) | t = cmpp.uc (a<b) | | |
| CYCLE 2 | r,s =cmpp.un.uc (c!=d) if q | l = cmpp.on (c!=d) if q | x =.. if p | |
| CYCLE 3 | | = ..y.. if r | | |
| CYCLE 4 | | | x =.. if s | x =.. if p |
| CYCLE 5 | | | | = ..x.. if t |

SCHEDULED CODE
(I.E., AFTER COMPILATION)

*Figure 3* (PRIOR ART)

| INPUT PREDICATE | RESULT OF COMPARE | un | uc | on | oc |
|---|---|---|---|---|---|
| 0 | 0 | 0 | 0 | – | – |
| 0 | 1 | 0 | 0 | – | – |
| 1 | 0 | 0 | 1 | – | 1 |
| 1 | 1 | 1 | 0 | 1 | – |

BEHAVIOR OF COMPARE OPERATIONS

*Figure 4B*

| CONDITIONAL COMPARE OPERATION | SEQUENTIAL FORM |
|---|---|
| $P_1$ = cmpp.un (r1 <cond> r2) if $P_2$ | $P_1$ = (r1 <cond> r2) · $P_2$ |
| $P_1$ = cmpp.uc (r1 <cond> r2) if $P_2$ | $P_1$ = ! (r1 <cond> r2) · $P_2$ |
| $P_1$ = cmpp.on (r1 <cond> r2) if $P_2$ | $P_1$ = P + (r1 <cond> r2) · $P_2$ |
| $P_1$ = cmpp.oc (r1 <cond> r2) if $P_2$ | $P_1$ = P + ! (r1 <cond> r2) · $P_2$ |

*Figure 9*

$S_1$: p = ! (a<b) · true
$S_2$: q = (a<b) · true
$S_3$: t1 = ! (a<b) · true
$S_4$: x = ... if p
$S_5$: x = ... if q
$S_6$: r = (c!=d) · q
$S_7$: s = ! (c!=d) · q
$S_8$: t2 = t1 + (c!=d) · q
$S_9$: x = ... if s
$S_{10}$: ... = ..y.. if r
$S_{11}$: ... = ..x.. if t2

SEQUENTIAL SSA FORM

*Figure 10*

```
lookup_AND_string (String S) routine
1:  // S has form [!] (r1<cond>r2)·¡
2:  if S not in table then
3:      create entry for S, say m;
4:      create entry for complement of S.say n;
5:      emit partition relation i = m|n;
6:  endif
7:  return symbol for S;
```

*Figure 11A*

```
scan_ops (List ops) routine
1:  for each compare operation in ops list do
2:      reduce the right-hand side to a normalized string S
3:      if compare is unconditional form then
4:          m=lookup_AND_string (S);
5:      else // compare is or-style
6:          m=lookup)_OR_string (S);
7:      endif
8:      map destination predicate to m;
9:  endfor
```

*Figure 11B* lookup_OR_string (String S) routine
1: if S not in table then
2:     if S has form j+[!] (r1<cond>r2)·i then
3:         let S' be the right-hand subexpr of S;
4:         k=lookup_AND_string (S'),
5:         further reduce S to j+k;
6:     endif
7:     // S has form j+k
8:     create entry for S, say m;
9:     emit partition relation m=j|k;
10: endif
11: return symbol for S;

*Figure 11C*

| SYMBOL | STRING | SOURCE NAMES |
|---|---|---|
| 1 | true | true |
| 2 | !(a<b)·1 | p, t1 |
| 3 | (a<b)·1 | q |
| 4 | !(c=d)·3 | |
| 5 | (c=d)·3 | |
| 6 | 2+4 | t2 |

*Figure 11E*

| SYMBOL | STRING | SOURCE NAMES |
|---|---|---|
| 1 | true | true |
| 2 | !(a<b)·1 | p |
| 3 | (a<b)·1 | |

*Figure 11D*

| SYMBOL | STRING | SOURCE NAMES |
|---|---|---|
| 1 | true | true |
| 2 | (a<b)·1 | p, t1 |
| 3 | !(a<b)·1 | q |
| 4 | !(c=d)·3 | r |
| 5 | (c=d)·3 | s |
| 6 | 2+4 | t2 |

Figure 11F

Schema      rel-comp = $(a_1, a_2, ..., a_k)$

INITIAL PARTITION GRAPH

COMPLETED GRAPH

IS_DISJOINT ROUTINE1 is_disjoint (Symbol P, Symbol Q)
1: if ∃ partition W = X|Y|Qi
      s.t. P⊆X and Q⊆Y then
2:     return true;
3: else
4:     return false;
5: endif

*Figure 15A*

IS_DISJOINT ROUTINE2 is_disjoint (Symbol P, Expression ε)
1: // assumes ε is reduced
2: for each symbol Q in ε do
3:    if!is_disjoint(P,Q) then
4:        return false;
5: endfor
6: return true;

*Figure 15B*

IS_SUBSET ROUTINE2 is_subset (Symbol P, Expression ε)
1:   // assumes ε is reduced
2:   for each symbol Q in ε do
3:     if is_subset(P,Q) then
4:       return false;
5:   endfor
6:   return false;

*Figure 15D*

IS_SUBSET ROUTINE1 is_subset (Symbol P, Symbol Q)
1:   // test for path from Q to P
2:   perform reverse depth-first search from P
3:   return true if Q is reached, else false;

*Figure 15C*

LUB_SUM ROUTINE1

```
lub_sum (Expression ε, Symbol P)
1:  ε' = ε_false ;
2:  for each symbol Q in ε do
3:      if Q ⊆ P then
4:          continue;
5:      else if P ⊆ Q then
6:          return ε;
7:      else
8:          ε' = ε' + Q;
9:      endif
10: endfor
11: return sum_reduce ( ε', P );
```

*Figure 15E*

LUB_SUM ROUTINE2

```
sum_reduce (Expression ε, Symbol P)
1:  add P to ε;
2:  for each partition R=P|Qi do
3:      if all Qi are members of ε then
4:          ε = sum_reduce ( ε, R );
5:          break;
6:      endif
7:  endfor
8:  if R is a member of ε then
9:      remove all proper descendents of R from ε;
19: endif
11: return ε;
```

*Figure 15F*

LUB_DIFF ROUTINE1

```
lub_diff(Expression ε, Symbol P)
1:  ε' = ε false ;
2:  for each symbol Q in ε do
3:      if Q⊆P then
4:          continue;
5:      else if P⊆Q then
6:          ε' = ε'+rel_cmpl(P,Q);
7:      else if P disjoint from Q then
8:          ε' = ε'+Q;
9:      else
10:         ε' =ε'+approx_diff (P,Q);
11:     endif
12: endfor
13: return ε;
```

*Figure 15G*

LUB_DIFF ROUTINE2

```
rel_cmpl (Symbol P,Symbol Q)
1:  // return expression for Q-P
2:  if !is_subset (P,Q) then
3:      return false_expr ();
4:  endif
5:  find a path from Q to P;
6:  let ε = ε false;
7:  for each edge R→S on path do
8:      let R=S|Ti be the partition
            containing edge R→S;
9:      add each Ti to ε;
10: endfor
11: return ε;
```

*Figure 15H*

LUB_DIFF ROUTINE 4 find_lca (Symbol P, Symbol Q)
1: let S_P be the set of ancestors of P;
2: let S_Q be the set of ancestors of Q;
3: return member of $S_P \cap S_Q$ having greatest distance from 1;

*Figure 15J*

LUB_DIFF ROUTINE 3 approx_diff (Symbol P, Symbol Q)
1: // over-approximate Q-P
2: return rel_cmpl (P, find_lca (P,Q));

*Figure 15I*

| | OP UNIT 1 | OP UNIT 2 | OP UNIT 3 | OP UNIT 4 |
|---|---|---|---|---|
| CYCLE 1 | p,q = cmpp.uc.un (a<b) | t = cmpp.uc (a<b) | | |
| CYCLE 2 | r,s =cmpp.un.uc (c!=d) if q | t = cmpp.on (c!=d) if q | x =... if p | x =... if q |
| CYCLE 3 | =...y... | if r | x =... if s | =...x... if t |

SCHEDULED CODE

*Figure 19*

COMPILING A PREDICATED CODE WITH DIRECT ANALYSIS OF THE PREDICATED CODE

BACKGROUND OF THE INVENTION

1. Field of the Invention

The present invention pertains to programming language compilers for computer systems. More particularly, this invention relates to a compiler for compiling a predicated code with direct analysis of the predicated code.

2. Description of the Related Art

As is known, a computer system typically includes one or more processors that are also known as central processing units (CPUs) or microprocessors. The processor typically executes instructions of software programs to perform a variety of tasks in the computer system. The instructions of the software programs are in machine language form (i.e., binary form) because the processor can only understand and interpret machine language. The machine language instructions are referred to as machine code or object code below Because the machine language is very difficult to write and understand, high level source programming languages (such as C and Fortran) have been developed to code or define the instructions of a software program in a humanly readable fashion. Such a source programming language software program is referred to as source code. The source code needs to be converted or translated into the machine code by a compiler program before being executed by the processor.

The earlier prior art processors are typically single instruction single data (SISD) processors. A SISD processor typically receives a single instruction stream and a single data stream. The SISD processor sequentially executes each instruction, acting on data in a single storage area. This SISD processor architecture, however, presents an obstacle to achieving high processing throughput.

To increase the processing throughput of a processor, many parallel processing architectures have been developed. One type of such parallel processing models is known as an instruction-level parallel (ILP) processor. In an ILP processor, the basic unit of computation (for which scheduling and synchronization decisions are made) is a processor instruction, such as an individual add, multiply, load, or store operation. Non-interdependent instructions are loaded and executed in parallel. Using ILP processors, instruction scheduling or synchronization decisions need not be made during program execution. Some decisions can be made during program compilation. For example, if the compiler can prove that two operations are independent (i.e., neither requires the result of the other as input), the operations can be executed in parallel.

However, frequent and unpredictable branch operations in a program code may present a major barrier to exploiting a greater amount of instruction-level parallelism. This is because some branch operations typically introduce branch latencies or mispredict penalties, thus causing the execution to stall at run-time. In addition, branch operations typically limit the scheduling scope of the code with respect to the instruction-level parallelism. The branch operations are referred to as branches.

In order to eliminate branches and further enhance the instruction-level parallelism, a new architectural model has been proposed in which each processor operation is guarded by a boolean-valued source operand. The value of the operand determines whether the operation is executed or nullified. This architectural model is referred to as predicated execution and the boolean-valued source operand is referred to as predicate. From the viewpoint of the instruction set architecture, the main features of the predicated execution are a predicate guarding each operation and a set of compare-to-predicate operations used to compute predicates. The predicated execution typically eliminates many branches completely and generalizes the rules for moving code among basic blocks. It is quite often that an entire acyclic control flow subgraph can be converted into a single, branch-free block of code.

The process of replacing branches with appropriate predicate computations and guards is referred to as if-conversion or predicate conversion. The resulting code from the if-conversion is referred to as predicated code. FIG. 1A shows the conventional code for a program represented in FIG. 1B. FIG. 1C shows the predicated code converted from the conventional code of FIG. 1A. As can be seen from FIG. 1C, explicit branches that control execution are replaced with guarding predicates on operations, together with compare-to-predicate operations that compute the appropriate predicate values. All non-branch instructions are predicated with the predicates during if-conversion. The result is a single, branch-free block of predicated code.

However, problems occur when a predicated code is compiled by a conventional compiler. This is because the data flow analysis tools of conventional compilers typically do not exploit relations between predicates when compiling the predicated code. FIG. 2 shows a conventional compiler 50 for compiling the predicated code. As can be seen from FIG. 2, the compiler 50 includes an if-conversion system 51, a scheduler and register allocator 52, and a data flow analysis system 53. The data flow analysis system 53, however, only analyzes the data dependency of the original code and does not incorporate information about relations between predicates of the predicated code into its data flow analysis. This typically causes the data flow analysis system 53 to either make incorrect assumptions about the run-time behavior of the predicated code or to make no assumption, which then yields overly-conservative results in crucial areas such as scheduling and register allocation. FIG. 3 shows a conservative schedule of the code in FIG. 1C, generated by the compiler of FIG. 2. FIG. 3 illustrates the drawback of using the conventional approach to compiling the predicated code.

SUMMARY OF THE INVENTION

One of the features of the present invention is to optimize compilation of a predicated code.

Another feature of the present invention is Lo improve run-time performance of a predicated code.

Another feature of the present invention is to provide a compiler which exploits predicate relations of a predicated code when compiling the predicated code.

A further feature of the present invention is to provide a predicate query system for a predicated code compiler that stores predicate relations of the predicated code such that the compiler can use the predicate relations to perform other data flow analysis on the predicated code such as is required by scheduling, allocation, and optimization.

Described below is a compiler for a predicated code. The compiler includes a data flow analysis system that manipulates and queries predicate expressions of the predicated code to analyze data flow properties of the predicated code.

In addition, a predicate-sensitive analyzer for a compiler that compiles a predicated code is also described. The predicate-sensitive analyzer includes a predicate query system to store local and global predicate relations of the predicated code and to answer queries about the local and global predicate relations.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 3 shows the predicated code of FIG. 1C after being compiled by the compiler of FIG. 2;

FIG. 4B shows a table of execution behavior of compare operations of the processor of FIG. 4A;

FIG. 9 is a table showing a single-target sequential form for compare-to-predicate operations of the predicated code;

FIG. 10 shows the sequential static single assignment form of the predicated code of FIG. 1C translated by the scanner of FIG. 7;

FIGS. 11A through 11C show various routines run by the scanner of FIG. 7 for extracting local predicate relations from the predicated code;

FIGS. 11D through 11F show the hash table at different stages for the predicated code of FIG. 10;

FIGS. 15A through 15D show various query routines run by the predicate query system of FIG. 7 for inquiring about predicated relations of the predicated code;

FIGS. 15E through 15J show various routines run by the predicate query system of FIG. 7 for manipulating predicate expressions of the predicated code;

FIG. 19 shows the scheduled code of the code of FIG. 10 after being compiled by the compiler of FIGS. 5–18.

DETAILED DESCRIPTION OF THE INVENTION

The following detailed description of some embodiments of the present invention uses certain terminologies for the sake of clarity. However, the invention is not limited to those specific terms employed, but rather includes all technical equivalents operating in a substantially similar manner to achieve a substantially similar result.

Figure 4A:
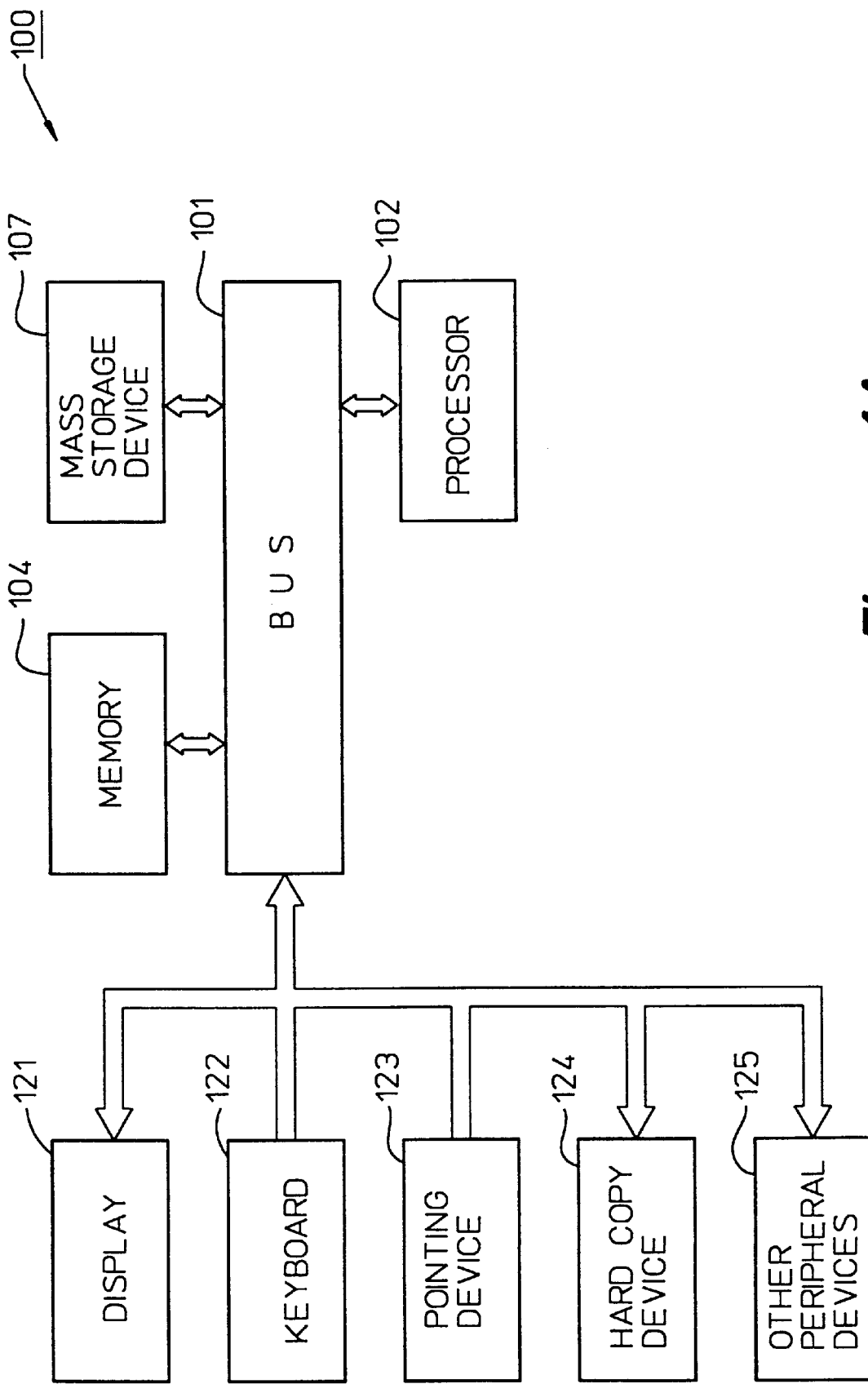
FIG. 4A shows a computer system that includes a processor that supports predicated execution.

FIG. 4A illustrates a computer system 100 that includes a processor 102 that supports predicated execution. The main features of the predicated execution are an additional boolean operand and a set of compare-to-predicate operations for computing predicates. To support the predicated execution, the processor 102 includes a set of predicate registers (not shown in FIG. 4A) to store the predicates. The predicate register file is connected to the ALU (Arithmetic and Logic Unit) (also not shown in FIG. 4A) of the processor 102 as the instruction format extension. Each register of the predicate register file stores a predicate input (i.e., predicate) that is used to guard the execution of an operation or instruction. Such an operation is referred to as a predicated operation. When the predicate for an operation has the value of one (i.e., true), the operation executes normally. When the predicate has the value of zero (i.e., false), the execution of the operation is nullified. This means that no change in the machine state takes place.

In addition, the instruction set of the processor 102 includes compare-to-predicate operations. The compare-to-predicate operations compute the predicates and write the computation result into the predicate registers of the predicate register file. Each of the compare-to-predicate operations can write into two predicate registers.

In one embodiment, each of the compare-to-predicate operations executed by the processor 102 has the following form.

$$p1, p2 = cmpp<d1><d2>(r1<cond>r2) \text{ if } q$$

In which p1, p2 are destination predicate register operands (i.e., predicates).

cmpp is the generic compare opcode.

<d1> and <d2> are two-letter descriptors that specify an action and mode for the compare operation. For example, the actions may include unconditional (u), conditional (c), parallel-or (o), and parallel-and (a) actions, specified by the first letter of the descriptor. Each action has both a normal mode (n) and a complement mode (c), specified by the second letter of the descriptor.

"r1<cond>r2" specifies the actual comparison. For example, the <cond> can be "<" (less than), ">" (greater than), "=" (equal to), "≦", (less than or equal to), or "≧" (greater than or equal to).

q is the predicate register operand for the compare operation.

Although q appears as a guarding predicate, it is only viewed as a data input to the compare operation.

Alternatively, the processor 102 may support other execution forms for the compare-to-predicate operations.

Figure 1:
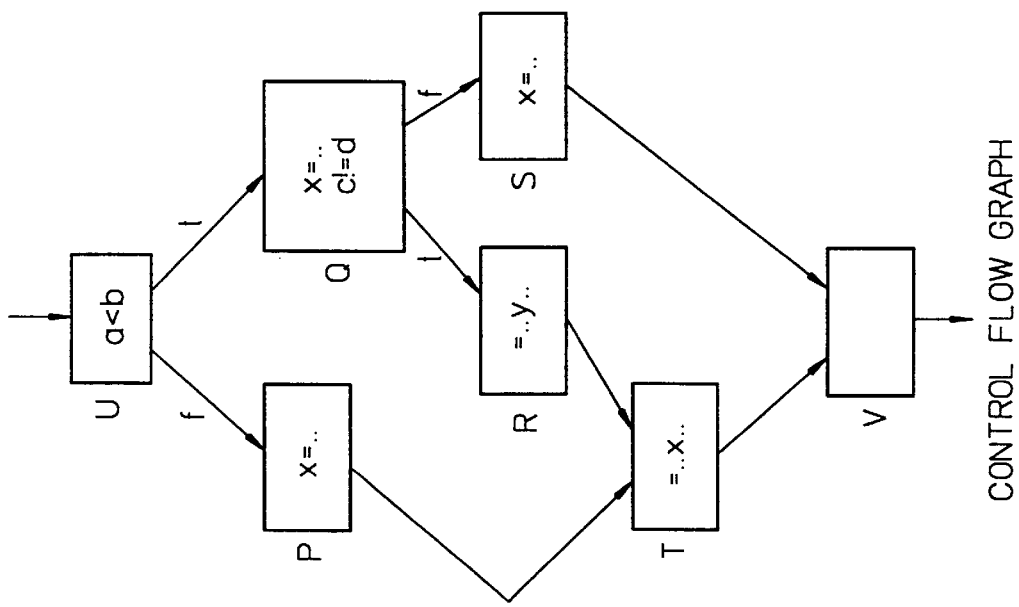
FIG. 1A shows a conventional code for a program.
FIG. 1B shows the control flow of the program.
FIG. 1C shows the predicated code (i.e., if-converted code) of the conventional code of FIG. 1A.
Figure 2:
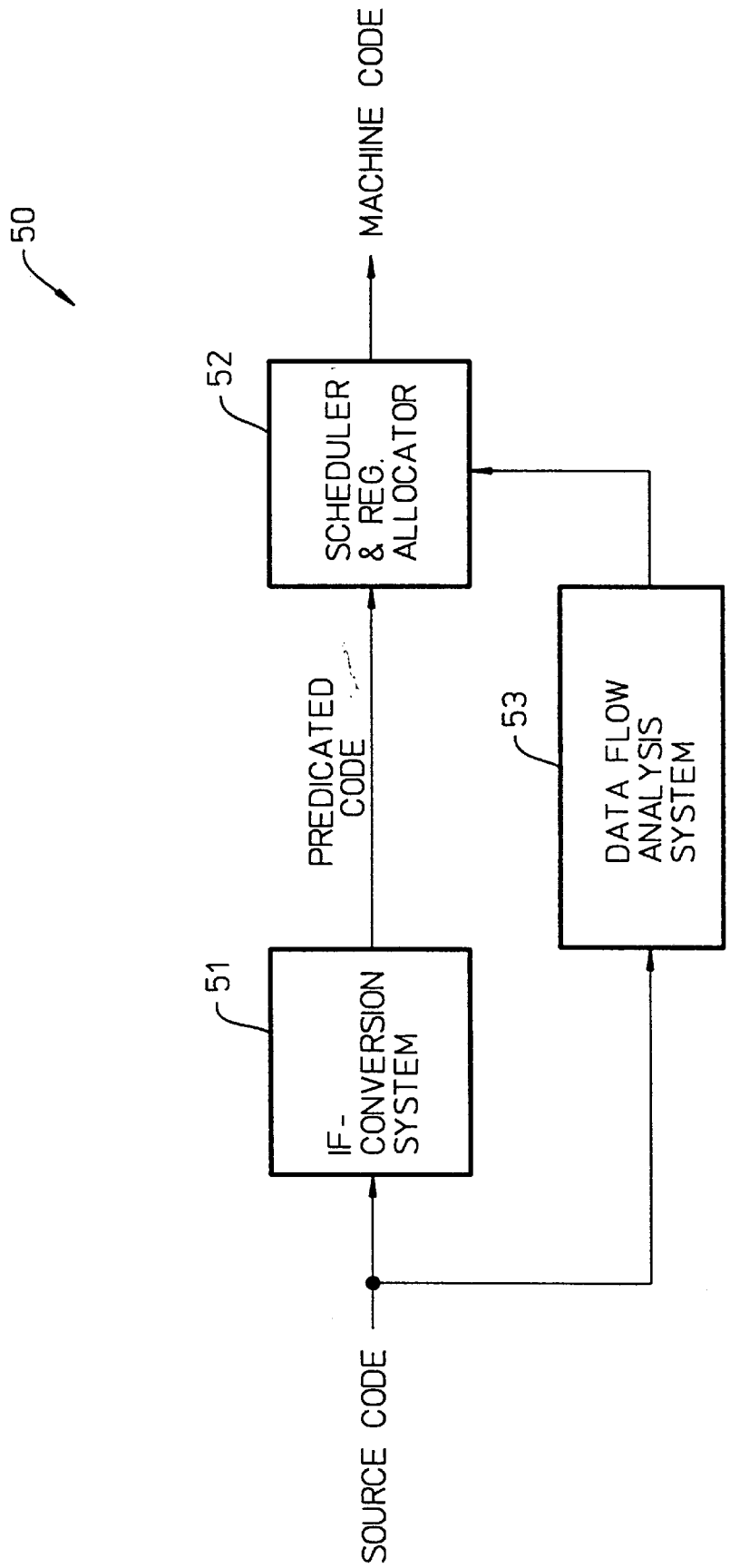
FIG. 2 shows a prior art predicated code compiler.

The predicated execution requires that the conventional code run on the processor 102 be if-converted into the predicated code (e.g., the predicated code of FIG. 1C). This means that each instruction of the code is predicated with a predicate and a set of compare-to-predicate instructions are added to compute the predicates. Because the if-conversion process only needs the unconditional and parallel-or actions to compute the predicates, the following description is mainly concerned with those two actions. The predicates computed by the unconditional actions are useful for instructions that execute based on a single condition. The predicates computed by the parallel-or actions are useful when execution of a block can be enabled by multiple conditions. FIG. 4B is a table that shows the execution behavior of the unconditional and parallel-or actions in both normal and complement modes. Each entry describes the result on the destination predicate. It is to be noted that the destination may be assigned a value or may be left unchanged (denoted as "–"). As can be seen from the table in FIG. 4B, an unconditional compare operation always writes a value into its destination register. Thus, although the input predicate appears as a guarding predicate for the compare operation, it should be viewed as an input operand to the compare operation.

Referring to FIG. 4A, in one embodiment, the computer system 100 can be a personal computer, a notebook computer, a palmtop computer, a workstation, a mainframe computer, or a super computer. In alternative embodiments, the computer system 100 can be other type of computer system. For example, the computer system 100 can be a network server or a video conferencing system.

The processor 102 is coupled to a bus 101. A memory 104 is also provided in the computer system 100. The memory 104 is connected to the bus 101 and typically stores information and instructions to be executed by the processor 102. The memory 104 can be implemented by various types of memories. For example, the memory 104 can be implemented by a RAM (Random Access Memory) and/or a nonvolatile memory. In addition, the memory 104 can be implemented by a combination of a RAM, a ROM (Read Only Memory), and/or an electrically erasable and programmable nonvolatile memory.

The computer system 100 also includes a mass storage device 107 that stores programs, data, and other information. The programs are executed by the processor 102 and need to be downloaded to the memory 104 before being executed by the processor 102.

A display 121 is coupled to the bus 101 for displaying information to a user of the computer system 100. A keyboard or keypad input device 122 is connected to the bus 101. An additional input device of the computer system 100 is a cursor control device 123, such as a mouse, a trackball, a trackpad, or a cursor direction key. Another device which may also be included in the computer system 100 is a hard copy device 124. The hard copy device 124 is used in the computer system 100 to print text and/or image information on a medium such as paper, film, or similar types of media.

The computer system 100 also includes other peripheral devices 126. These other devices 126 may include a floppy disk drive, a digital signal processor, a scanner, a LAN (Local Area Network) or WAN (Wide Area Network) controller, a digital signal processor, a MODEM (modulation/demodulation), and/or a CD-ROM drive. In addition, the computer system 100 may function without some of the above described components. Although FIG. 4A shows some of the basic components of the computer system 100, it is neither meant to be limiting nor to exclude other components or combinations of components in the computer system 100.

Figure 5:
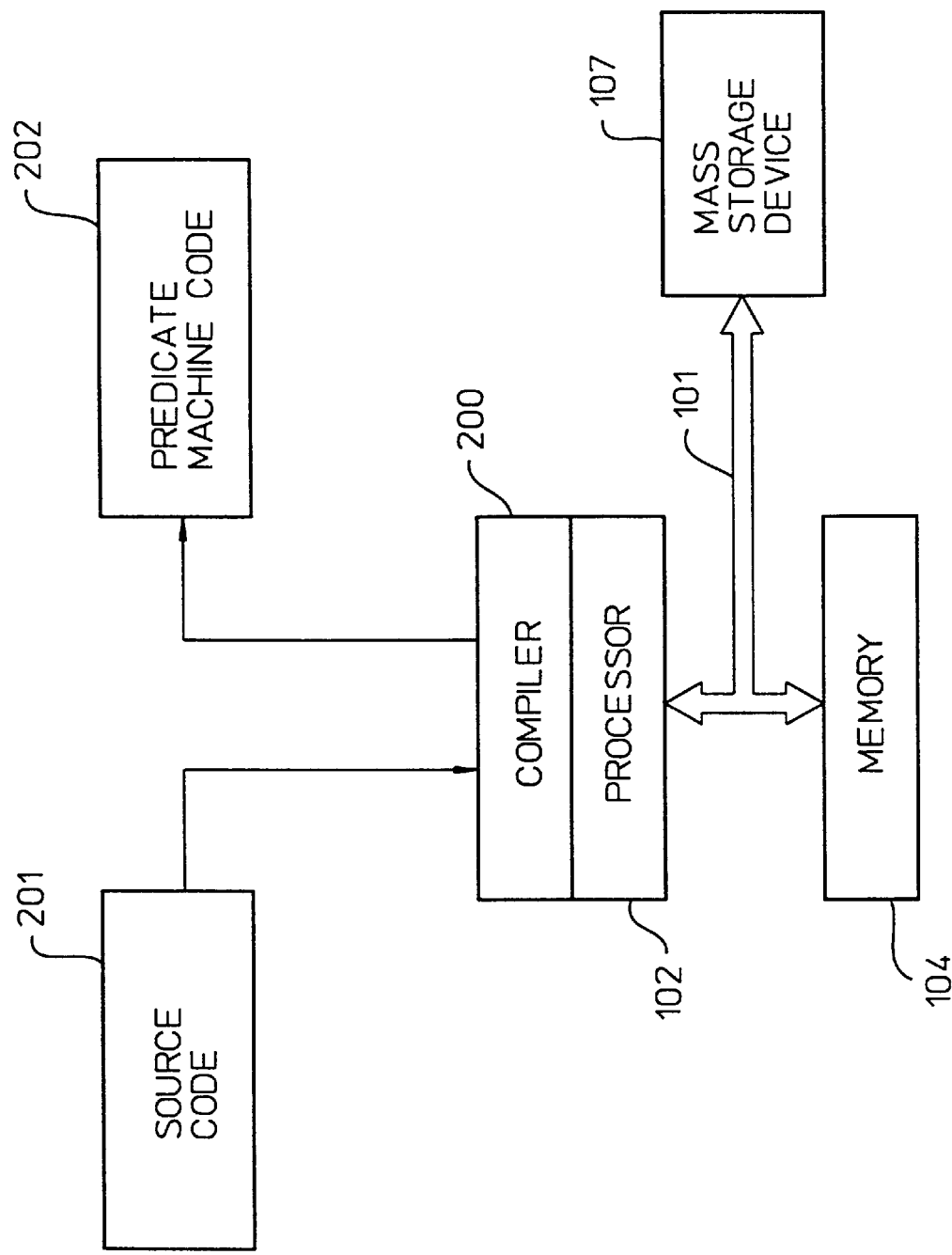
FIG. 5 shows a compiler program for the computer system of FIG. 4 that compiles a source code into a predicated machine code in accordance with one embodiment of the present invention.

The computer system 100 also includes a programming language compiler 200 (shown in FIG. 5). The compiler 200 is run on the processor 102 to compile a source code 201 into a predicated machine code 202. The predicated machine code 202 is then stored in the mass storage device 107. When the predicated machine code 202 is to be executed by the processor 102, the predicated machine code 202 is brought into the memory 104 by the processor 102.

The compiler 200 can be any kind of compiler program. For example, when the source code 201 is written in Fortran programming language, the compiler 200 is a Fortran compiler. When the source code 201 is written in the C programming language, the compiler 200 is a C programming language compiler.

The compiler 200 first converts the source code 201 (e.g., the source code of FIG. 1A) into the predicated code (e.g., the predicated code of FIG. 1C). To generate high quality predicated machine code for the processor 102 that supports predicated execution, the compiler 200 must incorporate information about relations between predicates of the predicated code into its data flow analysis prior to scheduling and allocation of the predicated code.

In accordance with one embodiment of the present invention, the compiler 200 performs a predicate-sensitive data flow analysis to the predicated code being compiled. The predicate-sensitive data flow analysis performed by the compiler 200 manipulates and queries predicate expressions of the predicated code to (1) analyze data flow properties of the predicated code and (2) annotate the analyzed data flow properties into the predicated code. The predicate-sensitive analysis is performed directly on the predicated code so that no correspondence to the original control flow is required (i.e., the analysis does not rely on the original source code). The analysis is performed by an analyzer of the compiler 200 in accordance with one embodiment of the present invention.

The data flow properties are properties that pertain to the flow of values between operations. Operations are executed conditionally according to control flow and predicated execution. One example is flow dependency analysis, which determines if a value produced by one operation is consumed by a subsequent operation Alternatively, the predicated code may still include branch instructions between predicated code blocks. In this case, the predicate-sensitive data flow analysis can accommodate the presence of conditional executions due to branching.

More specifically, the compiler 200 analyzes the compare-to-predicate operations or instructions in the predicated code to determine relations between the predicates. As described above, these operations or instructions are used to compute the predicates. The relations include such concepts as the disjointness of two predicates or the relation that a predicate p is subset of another predicate q (i.e., q is true whenever p is true). These relations are then captured in a unique data structure (i.e., a partition graph). The unique data structure is then used to represent and manipulate predicate expressions (i.e., symbolic boolean expressions) that represent executions for which each data flow property holds. The structure of the compiler 200 is shown in more detail in FIGS. 6 through 19, which will be described in more detail below.

Figure 6:
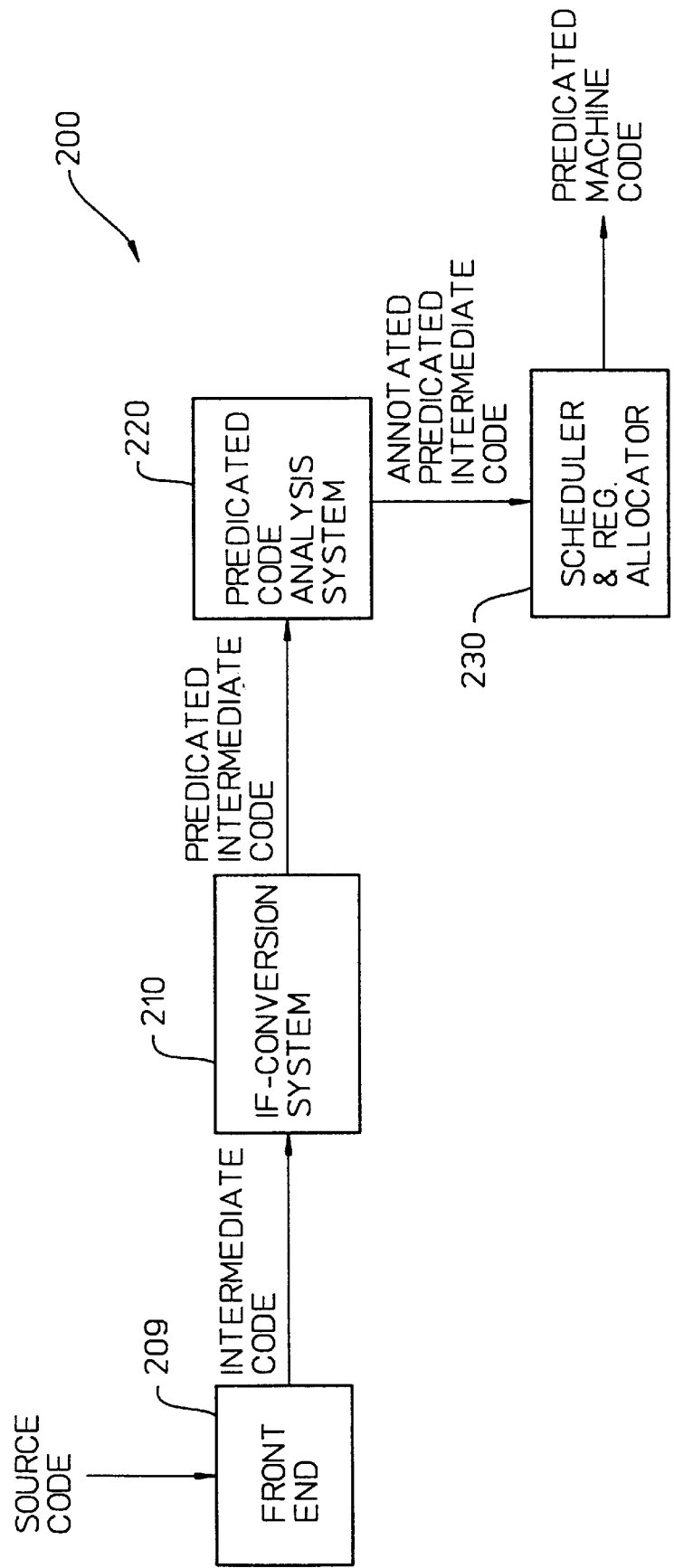
FIG. 6 shows the structure of the predicated code compiler of FIG. 5 that includes a predicated code analysis system and an if-conversion system to convert the source code into a predicated code.

FIG. 6 is a block diagram that shows the compiler 200 of FIG. 5 in more detail. As can be seen from FIG. 6, the compiler 200 includes an if-conversion system 210 coupled to a front end 209 of the compiler 200. The compiler 200 also includes a predicated code analysis system 220 coupled to the if-conversion system 210 and a scheduler and register allocator 230 coupled to the predicated code analysis system 220. The front end 209 performs known functions and can be implemented by any known front end of a compiler. The if-conversion system 210 can also be implemented by any known if-conversion system of a compiler that supports the execution form of the processor 102 of FIG. 4A. The scheduler and register allocator 230 can be implemented by any known scheduler and register allocator of a compiler that is capable of performing ILP scheduling.

The front end 209 receives the source code 201 (FIG. 5) and converts the source code 201 to an intermediate code which is then applied to the if-conversion system 210. The if-conversion system 210 converts the intermediate code to the predicated intermediate code (i.e., the predicated code) in a known way. The intermediate predicated code is then processed by the predicated code analysis system 220. The predicated code analysis system 220 processes the predicated intermediate code to extract the predicate relations from the code. This is because the if-conversion system 210 introduces the predicate relations when converting the source code into the predicated code. The predicated code analysis system 220 then uses the extracted predicate relations to analyze data dependency (i.e., scheduling constraints or precedence constraints) of the code and to annotate the analyzed data dependency into the code. In other words, the predicated code analysis system 220 exploits relations between predicates to accurately generate precedence edges (i.e., scheduling constraints) which are critical to ILP scheduling. The code then becomes an annotated predicated intermediate code with the precedence edges annotated into the code. The annotated predicated intermediate code is then applied to the scheduler and register allocator 230 for ILP scheduling and register allocation. The scheduler and register allocator 230 performs the ILP scheduling and allocation function in a known way.

Alternatively, the predicated code analysis system 220 can be directly applied with a predicated machine code via a disassembler (not shown). Such a system can be used, for example, to reschedule predicated machine code for a different computer system having a different processor. This process is known as object code translation.

Figure 7:
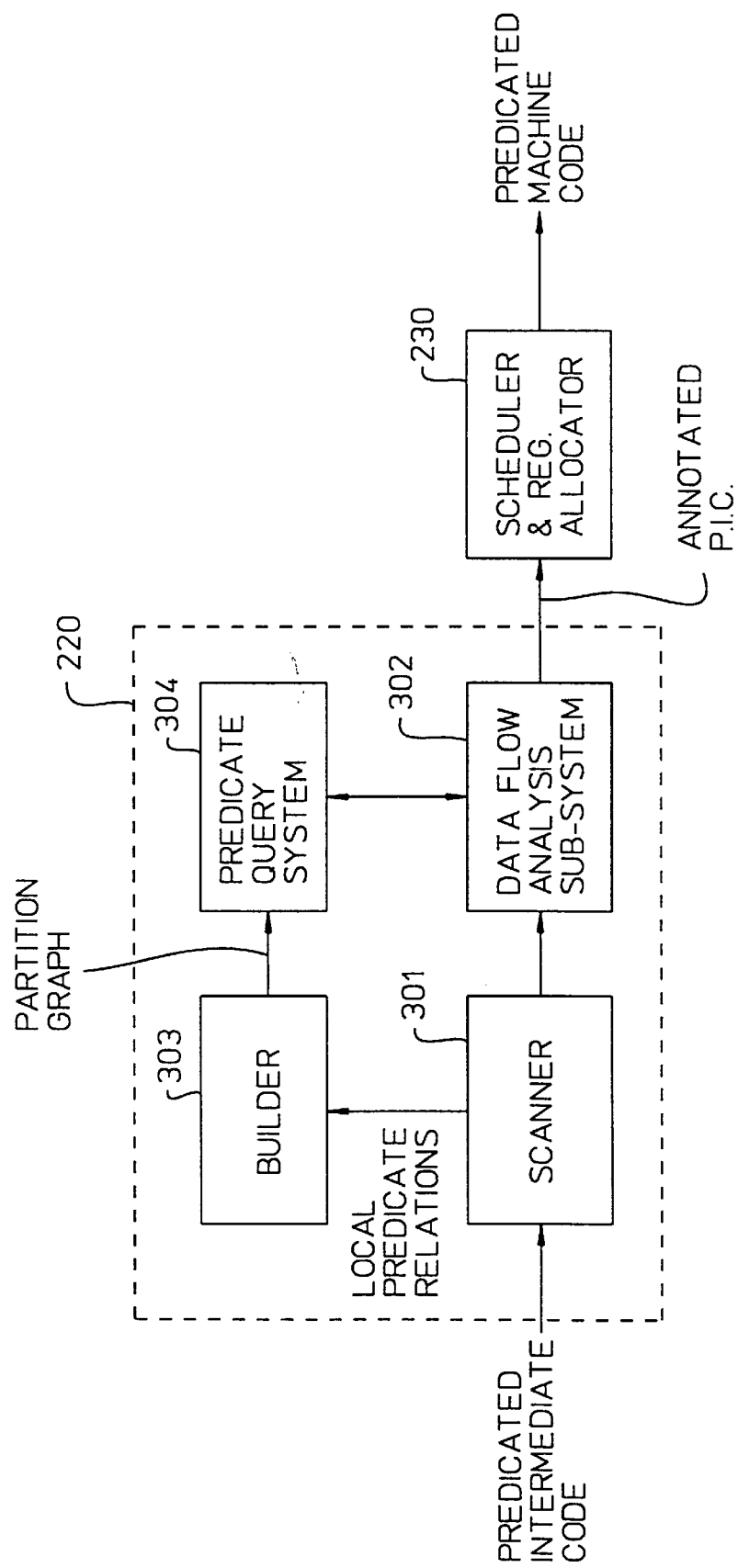
FIG. 7 shows the structure of the predicated code analysis system of FIG. 6.

In accordance with one embodiment of the present invention, the predicated code analysis system 220 is directly connected to the if-conversion system 210 to receive the predicated intermediate code. The predicated code analysis system 220 then provides direct analysis to the predicated intermediate code so that no correspondence to the original control flow is required. As described above, this allows (1) the scheduling constraints (i.e., data dependency) of the predicated code to be annotated into the code prior to scheduling and register allocation of the code and (2) the analysis not to rely on the control flow of the original source code. In other words, the analysis does not need to know the original source code and how the predicated code is generated. FIG. 7 shows in more detail the predicated code analysis system 220 of FIG. 6.

Before moving to FIG. 7, some terms are defined as follows.

1. PREDICATE BLOCK A predicate block is a straight line sequence of predicated operations. A predicate block is generally formed by if-conversion of a single-entry single-exit control flow region.
2. EXECUTION SET An execution set for a predicate p, denoted P, is the set of traces in which the predicate p is assigned true. An execution trace is a record of boolean values assigned to predicate variables during an execution of a predicate block. Here, we use "1" to denote the set of all possible execution traces. In the case of the predicate p, P is subset of 1 (i.e., $P \subseteq 1$) for any predicate p.
3. PARTITION GRAPH A partition graph is a directed acyclic graph whose nodes represent execution sets and whose labeled edges represent partition relations between nodes. Specifically, a partition U=M|N is represented by labeled edges U→$^r$M and U→$^r$N, where the common label r indicates that these edges all belong to the same partition. A partition graph is complete if it contains a unique node having no predecessors from which all nodes are reachable. To reduce clutter, edges are drawn with the same label (representing a single partition) so that their tails touch, thus omitting edge labels.
4. PREDICATE EXPRESSION A predicate expression is a symbolic expression that represents an execution set. The base symbols of predicate expressions are the names of execution sets for individual predicates, e.g., P, Q, 1, etc. Base expressions may be combined using the operators sum (+), difference (−), and product (·). A predicate expression is interpreted as the execution set formed by applying corresponding set operators to the base execution sets.

Referring now to FIG. 7, the predicated code analysis system 220 includes a scanner 301, a builder 303, a predicate query system 304, and a data flow analysis subsystem 302. The scanner 301 is connected to receive the predicated intermediate code from the if-conversion system 210 (FIG. 6). The scanner 301 is then connected to the data flow analysis system 302 which is then connected to the scheduler and register allocator 230. The builder 303 is also connected to the scanner 301. The predicate query system 304 is connected to the builder 303 and to the data flow analysis subsystem 302.

In one embodiment, each of the elements 301 through 304 of the predicated code analysis system 220 is implemented by software means. Alternatively, each or some of the elements 301–304 of the predicated code analysis system 220 can be implemented by hardware or firmware means.

The scanner 301 is used to extract local relations between predicates in the code. The predicate relations of a predicated code include the local relations and global relations. The local relations refer to the relations between predicates that are read or written by a single compare-to-predicate operation. In other words, the local relations come from the "cmpp" operations. The global relations refer to all other relations. In general, each local relation can be represented symbolically as a partition relation between the execution sets of predicates. For example, as can be seen from FIG. 1C, the relation between predicates p and q (e.g., p is disjoint from q) is considered as a local relation. Similarly, the relations between predicates q, r, and s (e.g., r is disjoint from s, r implies q, s implies q, q=r+s) is considered as a local relation.

Figure 8:
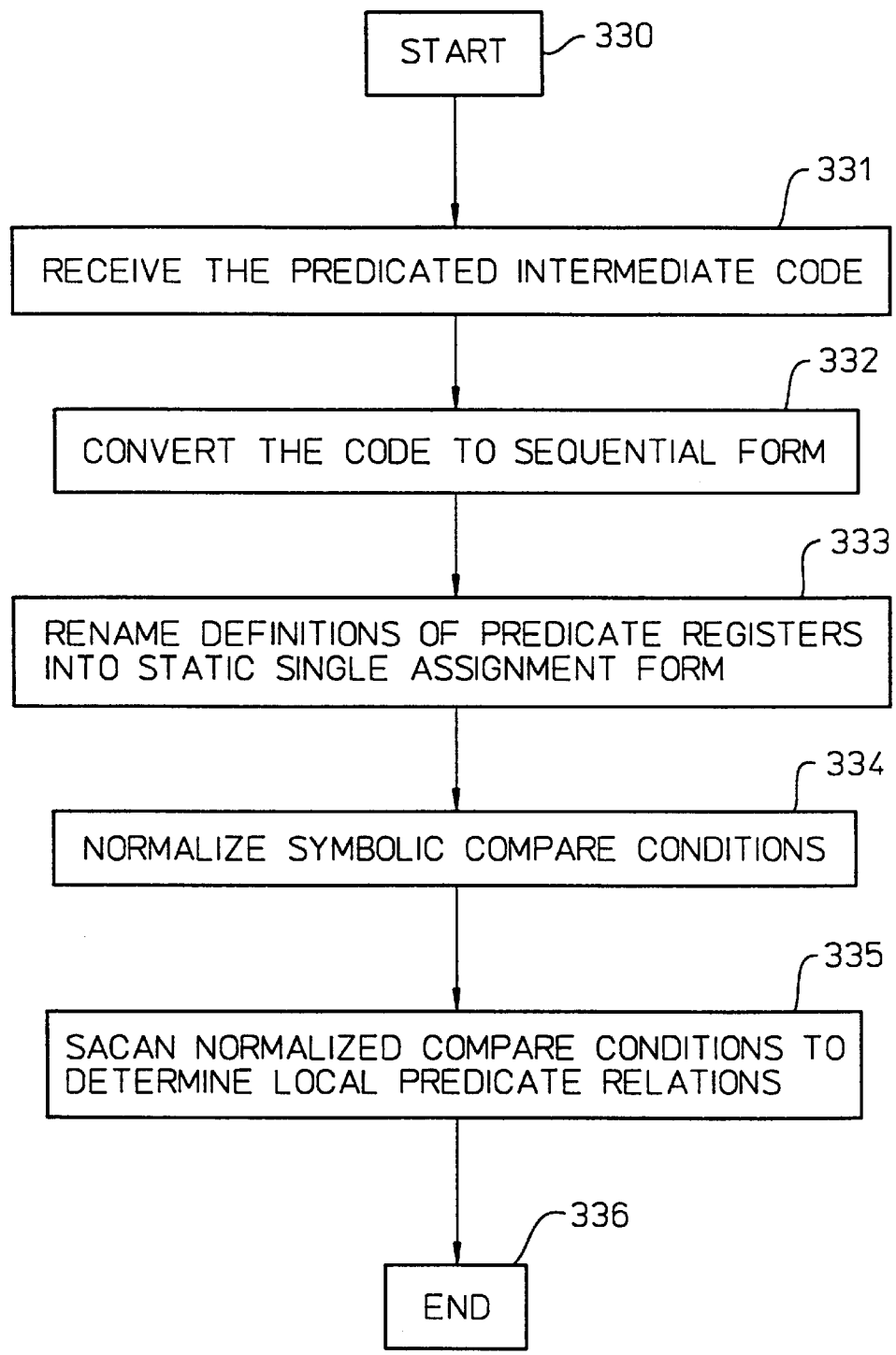
FIG. 8 is a flow chart diagram showing the operation of the scanner of the predicated code analysis system of FIG. 7.

To extract the local relations, the scanner 301 first translates the predicated code into a sequential static single assignment form, which simplifies subsequent processing. The scanner 301 then processes this form to discover local relations between predicates. FIG. 8 shows the process of the scanner 301, which will be described in more detail below.

As can be seen from FIG. 8, the process starts at step 330. At step 331, the scanner 301 of FIG. 7 receives the predicated intermediate code. At step 332, the scanner 301 converts the code into a single-target sequential form. This translation replaces unconditional and parallel-or operations in the code with a read-modify-write sequential version. FIG. 9 shows a table that illustrates the single-target sequential form. As can be seen from FIG. 9, the destination predicate value is a boolean function of the predicate input value and the compare condition. The scanner 301 can perform this translation function using the known technique.

At step 333, the scanner 301 converts the code into a static single assignment (SSA) form. At this step, the scanner 301 renames the variables in the code so that each variable can be individually identified at different phases. For example, if a variable t is defined several times in the code, the scanner 301 renames the variable t for each definition (i.e., t1, t2, t3, etc.). This technique is referred to as value numbering. To perform a simple value numbering, a counter is associated with each variable. The counter is incremented at every definition of the variable and is used as a subscript at subsequent uses of the variable. At step 334, the scanner 301 normalize the compare conditions of the predicated code in the sequential SSA form, with input operands being lexicographically ordered. For example, the normalized compare condition of $(a \leq b)$ is $!(a<b)$. Here, "!" means not. Normalization and value numbering allow other relations, such as complement, equality, and implication to be detected with a single hash function. The scanner 301 then sends the normalized predicated code in the sequential static single assignment form to the data flow analysis subsystem 302 (FIG. 7). FIG. 10 shows the converted and normalized sequential SSA form of the predicated code of FIG. 1C. As can be seen from FIG. 10, t1 and p are equivalent predicates. During the initial analysis of the predicated code, such equivalences can be detected and mapped to a single symbolic predicate.

Given a sequence of predicated operations of the code in sequential static single assignment form, the scanner 301 then scans the operations in order. As compare operations are processed, partition relations associated with the predicate symbols of the compare operands are emitted. This is done by the scanner 301 at step 335.

A hash table records the mapping between predicate names in the source and predicate symbols allocated during this phase. Integers numbered from 1 are used as node names. Initially, the hash table contains the true predicate mapped to 1. Compare operations are processed in order, and the hash table is updated to keep track of the mappings from compare expressions to symbolic name and from symbolic names to predicate registers. At each compare operation, the right-hand side is reduced by normalizing the compare condition and replacing predicate operands with their symbolic name.

The scanner 301 scans the code in the SSA form by running a lookup_AND_string routine, a scan_ops routine, and a lookup_OR_string routine. FIGS. 11A through 11C show these routines for scanning a predicate block to extract local relations. Alternatively, these routines can be written in other forms.

The main routine is the scan_ops, which iterates over compare-to-predicate operations in the predicate block. As each compare operation is visited, the right-hand side compare operation and guarding predicate is normalized into a string that serves as a hash key. The lookup_AND_string and lookup_OR_string routines process keys from unconditional and or-style compare-to-predicate operations, respectively. Both routines return a symbolic name corresponding to the predicate variable computed by the compare operation. In both cases, if a name for the computation does not already exist in the hash table, an entry is created. As a result of adding entries to the hash table, new partition relations may be generated.

Below shows an example of how local relations are extracted from the code shown in FIG. 10 using the routines of FIGS. 11A–11C. The code of FIG. 10 is listed again below with the compare operations normalized and non-compare operations omitted.

$p=!(a<b) \cdot \text{true}$ $q=(a<b) \cdot \text{true}$ $t1=!(a<b) \cdot \text{true}$ $t2=t1+!(c=d) \cdot q$ $s=(c=d) \cdot q$ $r=!(c=d) \cdot q$ Operations are processed in order, producing the following effects.

The initial hash table maps true to 1 and creates a symbolic name for the execution set.

$p=!(a<b) \cdot \text{true}$. This can be reduced to $p=!(a<b) \cdot 1$. During lookup, the right-hand side and its complement are added to the initial table (see FIG. 11D) and a partition relation is emitted, which is 1=2|3.

$q=(a<b) \cdot \text{true}$. This can be reduced to $q=(a<b) \cdot 1$, which is further reduced to q=3. Action: add q to the list of source names for symbol 3.

$t1=!(a<b) \cdot \text{true}$. This can be reduced to t1=2. Action: add t1 to the list of source names for symbol 2.

$t2=t1+!(c=d) \cdot q$. This can be reduced to $t2=2+!(c=d) \cdot 3$. During lookup, "$!(c=d) \cdot 3$" and its complement are added to the hash table (See FIG. 11E) and a partition relation is emitted, which is 3=4|5. The outer expression is further reduced to t2=2+4, which is added to the hash table (FIG. 11E) and a partition relation is emitted, which is 6=2|4.

$s=(c=d) \cdot q$. This can be reduced to s=5. Action: add s to the list of source names for symbol 5.

$r=!(c=d) \cdot q$. This can be reduced to r=4. Action: add r to the list of source names for symbol 4.

The final hash table is shown in FIG. 11F, along with the final partition relations (local relations) emitted. These relations are 1=2|3, 3=4|5, and 6=2|4.

Figure 12:
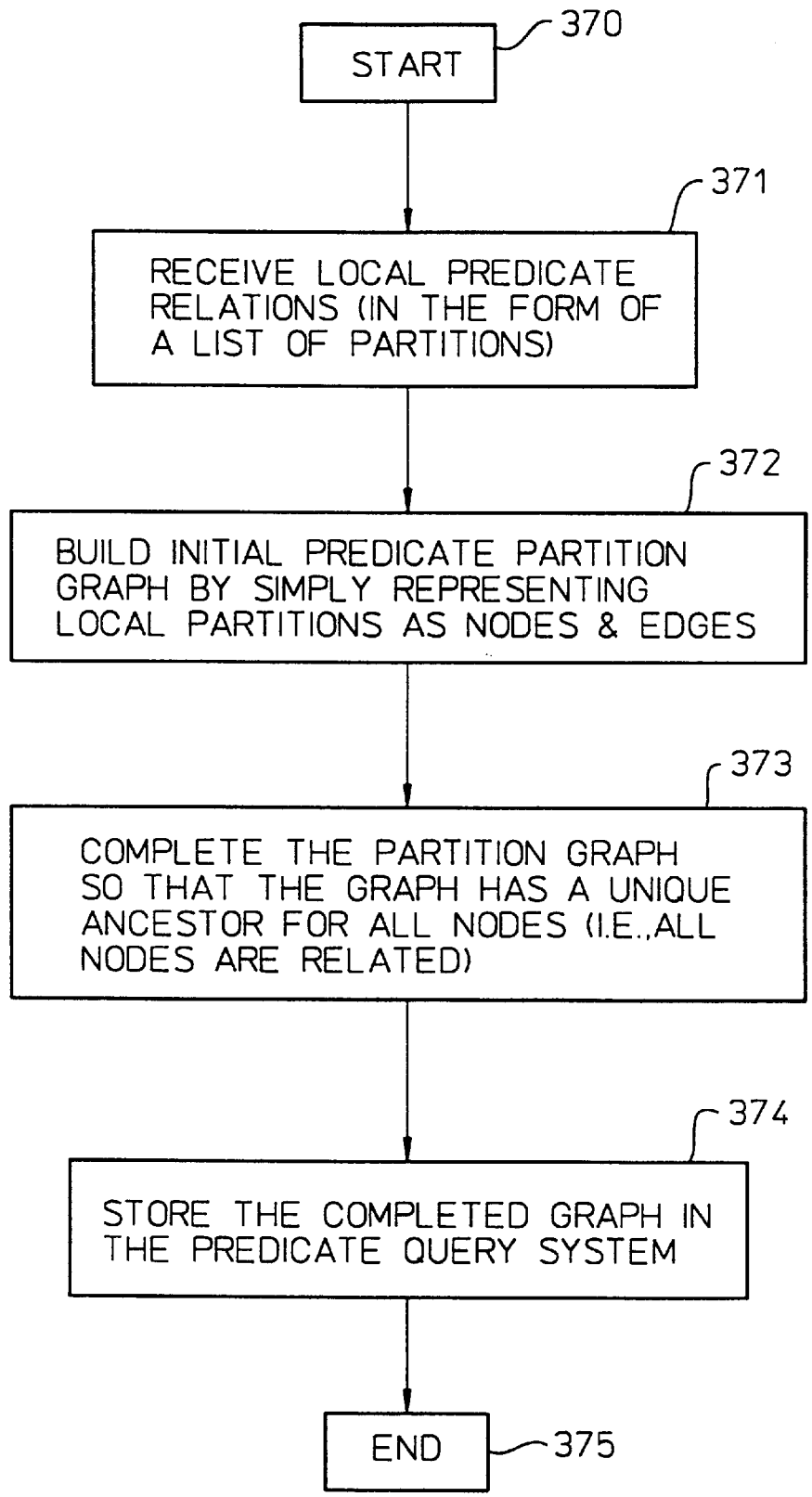
FIG. 12 is a flow chart diagram of the operation of the builder of the predicated code analysis system of FIG. 7.

Referring back to FIG. 7, after the scanner 301 extracts the local relations from the predicated code, the scanner 301 sends the extracted local relations to the builder 303. The builder 303 then determines the global relations of the code by combining the local relations. For example, if we know the relations of 1=P|Q and Q=R|S, then we can deduct that P is disjoint from both R and S. The builder 303 determines the global relations by building a partition graph with the local relations extracted from the code and then completing the partition graph. FIG. 12 shows the process of the builder 303 to build and complete the partition graph.

Figure 14A:
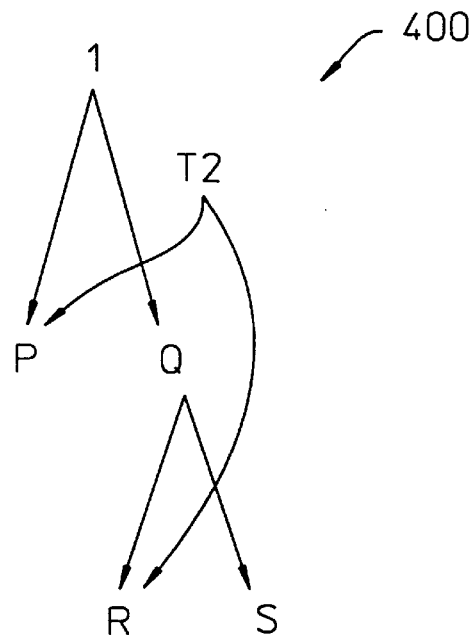
FIGS. 14A and 14B illustrate the initial partition graph and the completed partition graph of the predicated code of FIG. 10.

As can be seen from FIG. 12, the process starts at step 370. At step 371, the builder 303 receives the local relations that are in the form of a list of partitions. At step 372, the builder 303 builds an initial partition graph 400 by simply representing the local relations as nodes and edges. FIG. 14A shows the initial partition graph 400 of the predicated code of FIG. 10 built by the builder 303 with the local relations of 1=P|Q, Q=R|S, and T2=P+R. As can be seen from FIG. 14A, the initial partition graph 400 is not a complete graph because not all nodes are reachable from the root In particular, node T2 is not reachable from the root. This is because nodes corresponding to unconstructed control regions, whose partitions come from or-style comparisons, will not initially be reachable.

At step 373, the builder 303 completes the initial partition graph. To complete the initial partition graph, additional partitions consistent with existing partitions need to be synthesized so that all nodes are reachable from the root. The builder 303 completes the partition graph by running a routine shown below.

1. Let L be a list of partitions not reachable from the partition graph root node. Furthermore, let the partitions in list L occur in the order in which they were encounted during scanning.
2. For each partition in L, say p=m/n <u>do</u>
    let lca be the lowest common ancestor of m and n such that lca is reachable from the root;
    lca can now be partitioned into p and r, where r is the relative complement of p with respect to lca;
    if r does not exist as a node in the partition graph (i.e., if rel_comp returns a set of nodes with more than one element), create a partition subtree rooted with node r to represent the relative complement (see FIG. 13). This tree can be a simple chain.

Figure 13:
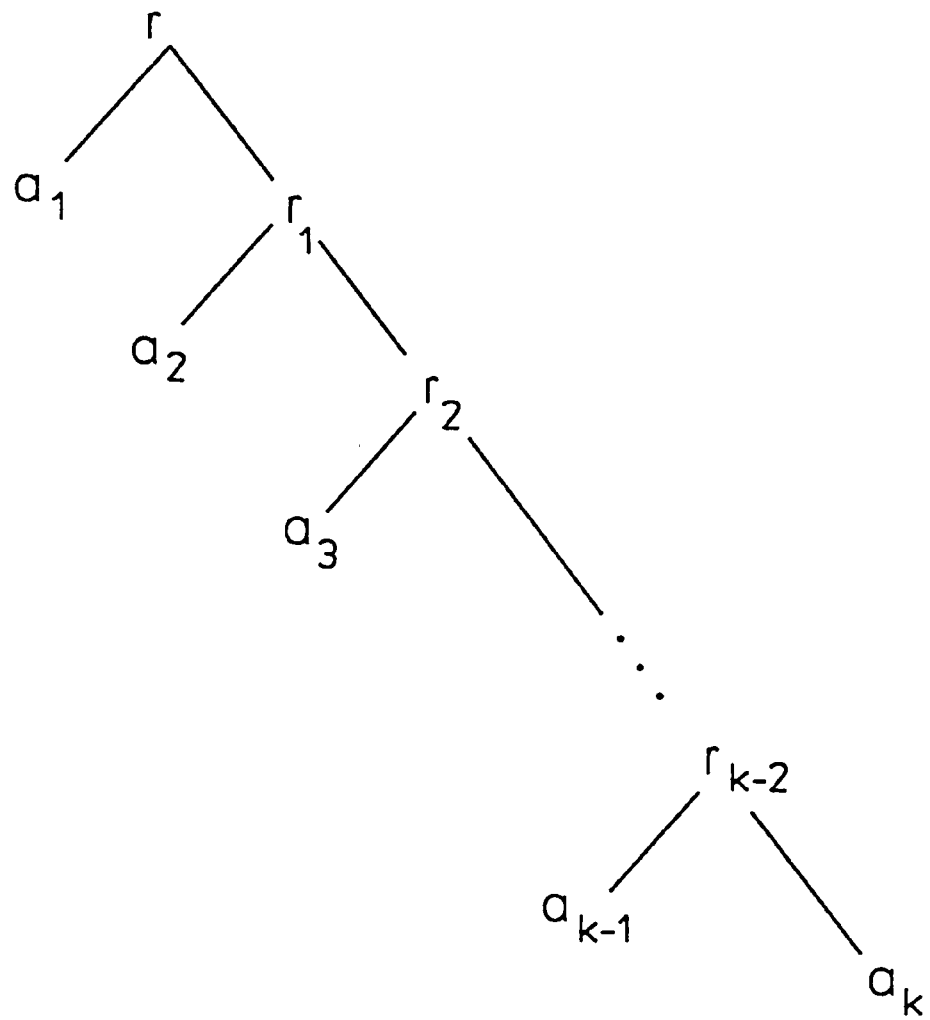
FIG. 13 shows a relative complement partition sub-graph.

Alternatively, the routine of FIG. 13 can be written in other forms. The completed partition graph is a data structure that combines the local relations with the global relations in a form amenable to answering general queries about predicate relations.

Figure 14B:
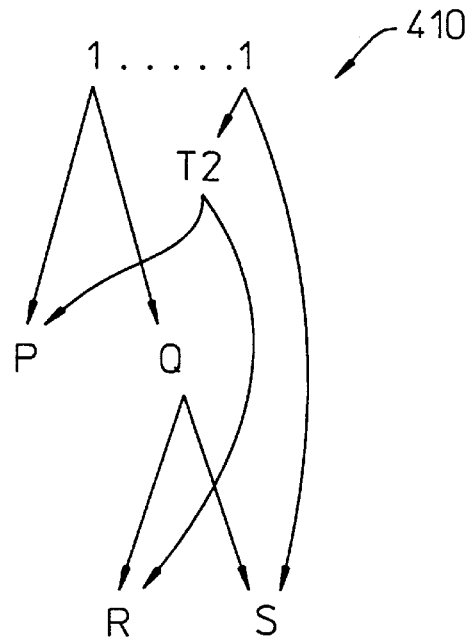

By running the above described routine, the builder 303 completes the initial partition graph 400 of FIG. 14A into the complete partition graph 410 of FIG. 14B. Here, the builder 303 can determine by examining the initial partition graph 400 of FIG. 14A that although the node T2 is not reachable from the node 1, its successors P and R (through Q) are reachable from the node 1. Also, the builder 303 can determine that the node 1 itself is the lowest common ancestor of P and R. Thus, the relative complement of T2 with respect to 1 (i.e., 1–T2) can be computed as (1–R)–P (The relative complement of a node N with respect to an ancestor M is found by collecting the union of siblings of nodes along any path from M to N. For example, P and S are the siblings of nodes on the path from 1 to R, so 1–R=P+S). Therefore, 1–T2=(1–R)–P=(P+S)–P=(P–P)+S=S. Hence, 1=T2|S. This partition (i.e., 1=T2|S) is then added to the graph, completing the partition graph 410 (FIG. 14B). The completed partition graph is then stored in the predicate query system 304 (FIG. 7) at step 374. The process then ends at step 375.

As can be seen from the partition graph 410 of FIG. 14B, the predicates p and s are disjoint from each other.

Referring back to FIG. 7, the predicate query system 304 interfaces the data flow analysis subsystem 302. The predicate query system 304 stores the completed partition graph received from the builder 303 and uses the partition graph to answer queries from the data flow analysis subsystem 302. The data flow analysis subsystem 302 analyzes the predicated code in the SSA form to determine data flow properties of the code. In other words, the data flow analysis subsystem 302 computes (1) data dependencies of the code, (2) up and down exposed definitions and uses, and (3) live range and interference information during register allocation. When analyzing the data flow of the code, the data flow analysis subsystem 302 generates queries about the predicate relations of the code by sending the corresponding query commands to the predicate query system 304. The predicate query system 304 then runs the corresponding query routines to determine if each of the predicate relation queries is true or false. FIGS. 15A through 15J show various query routines for the predicate query system 304. Alternatively, these query routines can be implemented in other forms. After running the query routines, the predicate query system 304 informs the data flow analysis subsystem 302 whether each of the queries is true or false.

For example, when the data flow analysis subsystem 302 encounters predicates p and q in the code, the subsystem 302 needs to know if the predicate p is disjoint from or subset of the predicate q. In this case, the subsystem 302 generates the is_disjoint (p, q) and is_subset (p, q) query commands to the predicate query system 304. The predicate query system 304 then runs the corresponding query routines to determine if each of the queries is true or false.

The query commands from the data flow analysis subsystem 302 includes the following.

true_expr ( ); a predicate expression representing the universal set of executions.

false_expr ( ); the null predicate expression representing the empty set of executions. These two commands are used to initialize predicate expressions in data flow vectors (described below) to the appropriate default value. For example, in liveness analysis, every vector is initialized to the false expressions, representing no variables live.

lub_sum (p, $\epsilon$); a smallest $\epsilon'$ such that $P \cup \epsilon \subseteq \epsilon'$.

glb_sum (p, $\epsilon$); a largest $\epsilon'$ such that $P \cup \epsilon \supseteq \epsilon'$. These two commands are used to generate a property at a point under a guarding predicate. The choice between least upper bound and greatest lower bound is determined by the data flow problem being solved. For example, in liveness analysis, if variable x is live in executions represented by expression $\epsilon$ just after an operation in which x is used under guarding predicate p, then x will be live in executions represented by expression $\epsilon+P$ just before the operation. Since liveness is an "any path" problem, overapproximation of the execution set is conservative and so we compute $\epsilon+P$ using lub_sum (p,$\epsilon$). For an "all path" problem, the execution set must be under-approximated. Thus, a predicate expression can be computed using glu_sum.

lub_diff (p,$\epsilon$); a smallest $\epsilon'$ such that $\epsilon-P \subseteq \epsilon'$;

glb_diff (p, $\epsilon$); a largest $\epsilon'$ such that $\epsilon-P \supseteq \epsilon'$. These commands are used to kill a property at a point under a guarding predicate. For example, in liveness analysis, if variable x is live in executions represented by expression $\epsilon$ just after an operation in which x is defined under guarding predicate p, then x will be live in executions represented by $\epsilon-P$ just before the operation. Since liveness is an "any path" problem, overapproximation of the execution set is conservative and we compute $\epsilon-P$ using lub_diff (p, $\epsilon$).

is_disjoint (p, $\epsilon$); true if $P \cap \epsilon = 0$. This command is used to test whether a property holds in some execution at a point under a guarding predicate. For example, two variables interfere (i.e., they must be assigned to different physical registers) if one is live at a definition point of the other. If variable y is live in executions represented by E at a point where variable x is defined under predicate p, then the variables interfere if $\epsilon$ is not disjoint from P. This is tested using is_disjoint (p, $\epsilon$).

is_subset (p, $\epsilon$); true if P is a subset of the execution set represented by $\epsilon$. This command is used to test whether a property holds in all executions at a point under a guarding predicate.

The variables of predicate expressions are symbols denoting execution sets for individual predicates, and they are represented explicitly by nodes in the partition graph. To efficiently and accurately answer queries about predicate relations and manipulate the predicate expressions, the query routines restrict predicate expressions to disjunctions of individual symbols, known as 1-disjunctive normal form (1-dnf). Such expressions can be stored either as a list of symbols or as a bitvector having one bit per symbol (i.e., one bit per node in the partition graph).

FIG. 15A shows the query routine for testing disjointness between a pair of symbols and FIG. 15B shows the query routine for testing disjointness between a symbol and a predicate expression (in reduced 1-dnf form). It is to be noted that the false expression $\epsilon_{false}$ is simply an empty list of predicate symbols. The true expression $\epsilon_{true}$ is the list containing 1, the root of the partition graph. The routines attempt to show disjointness between two symbols P and Q by finding a partition such that P and Q are contained in disjoint parts. If no such partition exists, P and Q are assumed to intersect.

FIGS. 15C and 15D show the query routines for testing the subset relations. Execution set P is a subset of Q if there is a reverse path from node P to node Q in the partition graph. The subset relations is analogous to dominance and post-dominance, but is insensitive to temporal ordering of the predicate computations.

FIGS. 15E and 15F show the routines for summing a single symbol into a predicate expression. The sum_reduce routine is performed when the new symbol to be added to an expression is a subset of a symbol already being contained in the expression. In this case, the new symbol is added and the resulting expression is recursively reduced.

FIGS. 15G through 15J show the routines for subtracting a symbol P from a predicate expression. Here, approximation is required. When symbol P is a subset of symbol Q in the expression, Q-P can be computed by replacing Q with the relative complement of P with respect to Q, which can always be represented by a 1-dnf expression. This is done by the approx_diff routine (FIG. 15H). If P intersects Q in the expression but is neither a subset or superset, then approximation is required to represent the set difference, which is done by the rel_cmpl routine (FIG. 15I). Any superset of the set difference is a valid approximation. In this case, the relative complement of P with respect to the lowest-common ancestor of P and Q can be approximated by the find_lca routine of FIG. 15J.

Referring to FIG. 7, the data flow analysis subsystem 302 performs a predicate-sensitive bitvector analysis to compute whether a property holds for a set of executions at every point in a control flow graph (i.e., at a point within an execution set). Each variable maps to a particular position within all bitvectors. Each vector position is extended to hold a predicate expression instead of a single bit. When an operation generates a property under a predicate p, then the property holds for all executions in P at that point, and so set P is added to the execution set at that point. If an operation kills a property under predicate q, then Q is subtracted from the execution set at that point. In this case, the notion of testing a property at a point of the control flow graph is extended to testing whether the property holds at a point in some subset of executions. These expression manipulations are performed using the above mentioned query commands to the predicate query system 304.

Figure 16:
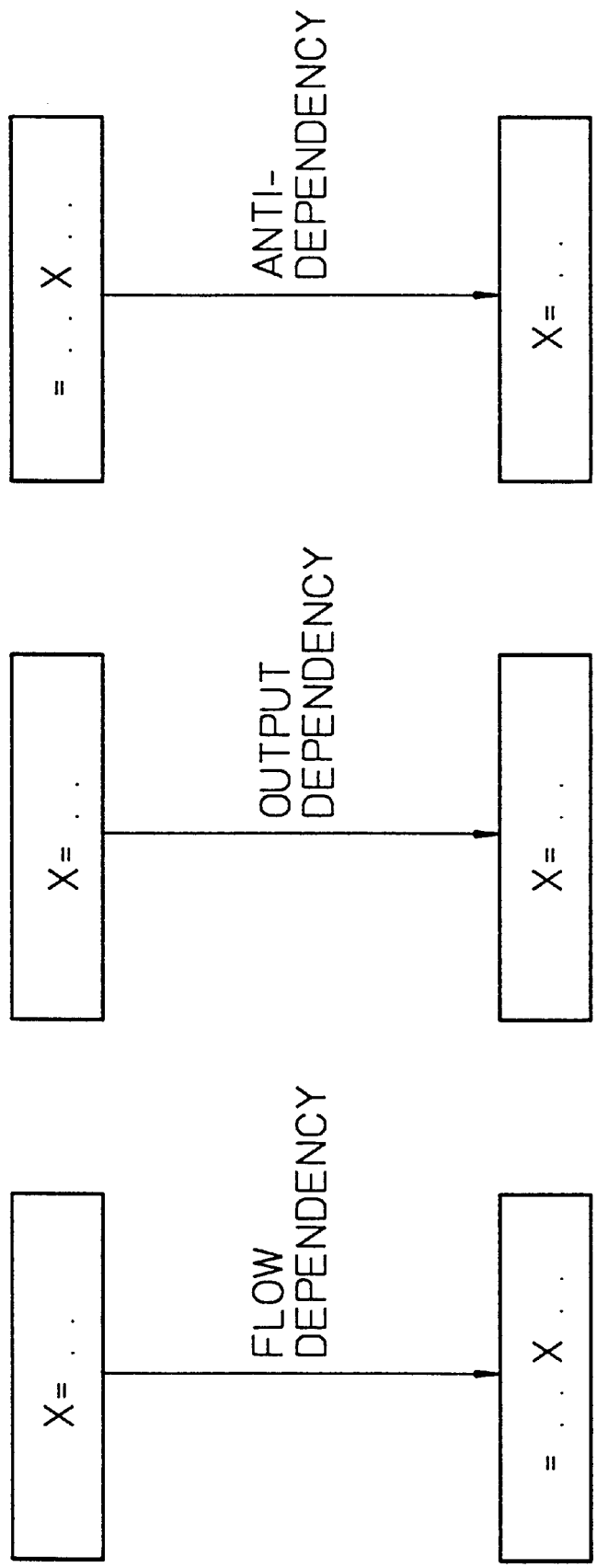
FIG. 16 shows various types of flow dependencies between two instructions.

The predicate-sensitive bitvector analysis includes a flow analysis and a liveness analysis. The flow analysis is used for scheduling and the liveness analysis is used for register allocation. FIG. 16 shows various types of flow dependencies between two instructions. As is known, a variable x is live at a point of the control flow graph if there is a path containing no definition of x from that point to a use of x. The difference between the flow analysis and the liveness analysis is that the flow analysis is forward-propagated throughout the control flow graph while the liveness analysis is backward-propagated throughout the control flow graph.

In the predicate-sensitive liveness analysis, a vector of predicate expressions having one position for each variable in the code is used. Each predicate expression represents the set of executions in which the corresponding variable is live at that point. The predicate expressions are updated as each operation is visited in reverse order.

At an operation, $E^-$ is used to denote an expression just prior to the operation, and $E^+$ is used to denote an expression just after the operation. Consider, for example, a use of variable x guarded by a predicate p. The use of x generates liveness of x in all executions in set P just prior to the operation, i.e., at the operation, $E^-_x = E^+_x + P$ (using the lub_sum routine). A definition of x guarded by a predicate q kills liveness of x in all executions in set Q, i.e., at the operation, $E^-_x = E^+_x - Q$ (using the lub_diff routine). At a definition of a variable y guarded by predicate r, y interferes with x if x is live under predicate r, i.e., if $E^+_x \cap R \neq 0$. Interference is tested using the is_disjoint routine. The !disj represents the complement of the is_disjoint routine.

Figure 17:
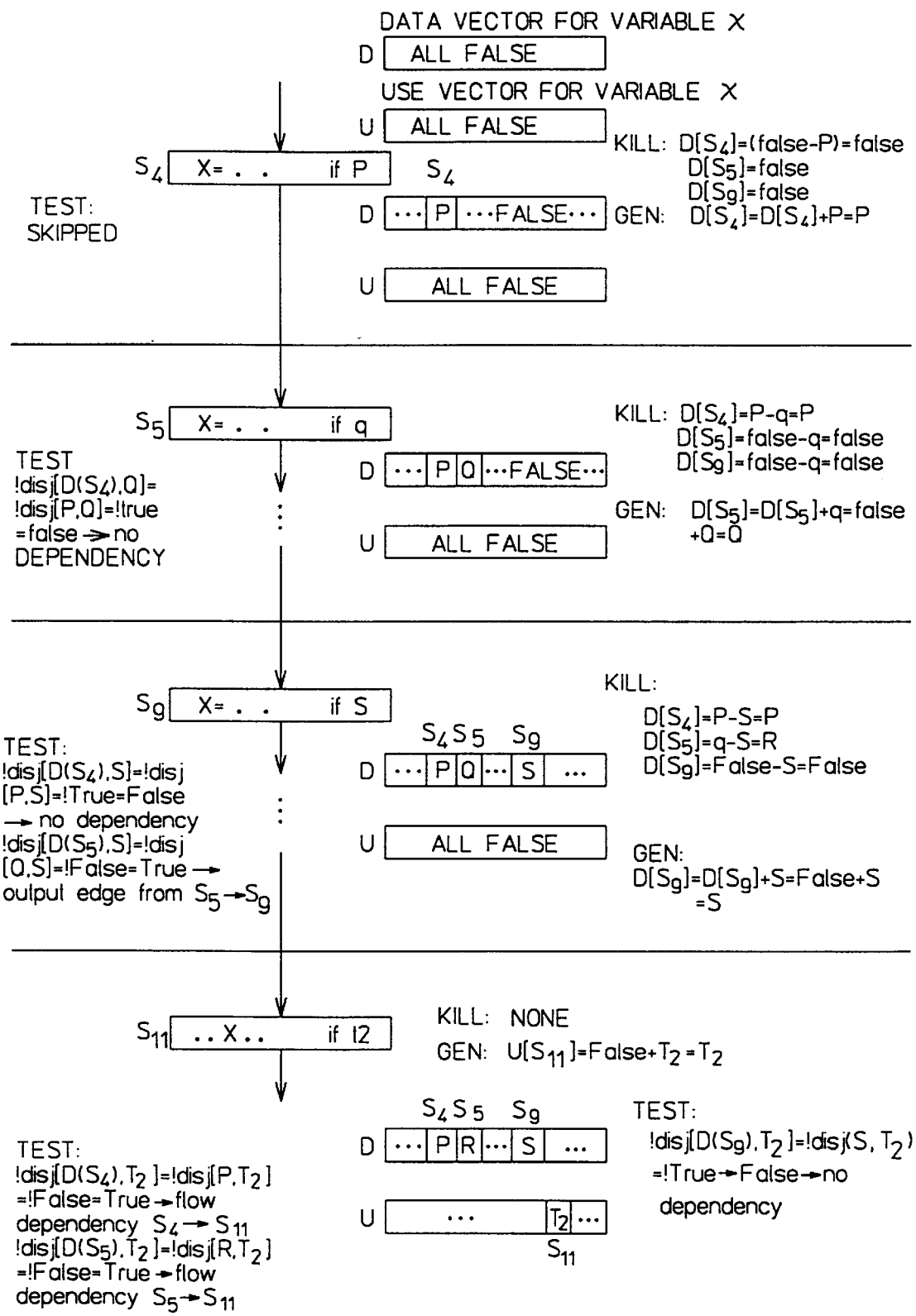
FIG. 17 shows the process of determining flow dependency of a variable x of the predicated code of FIG. 10 by the data flow analysis subsystem of FIG. 7.

FIG. 17 is an example that shows the process of the predicatesensitive bitvector analysis performed by the data flow analysis subsystem 302 of FIG. 7 on a portion of the code of FIG. 10. FIG. 17 only shows the analysis process for the variable x of the code of FIG. 10 for the sake of simplicity and clarity.

There are GEN, KILL, and TEST functions that are corresponding to each operation. These functions manipulate the data flow information at that point in the program. These functions represent the affect of the operation on the data flow values. Each operation also has an associated TEST function for sampling the data flow values at that point in the program. In dependence analysis, a data dependence edge is created when the TEST function returns true.

As can be seen from FIG. 17, a data vector and a use vector are provided for variable x. The two vectors are initially set to false because the analysis is performed in the forward order. Alternatively, the vectors can be initially set to true. Then the GEN, KILL, and TEST processing functions are applied to the operations (i.e., the operations $S_4$, $S_5$, $S_9$, and $S_{11}$) for ordinary definitions and uses. Within each operation, the definitions are processed before the uses.

At operation $S_4$, the GEN, KILL, and TEST functions are applied. Here, the TEST processing is skipped because the data vector is false for all definition vector positions (i.e., $D[S_4, S_5, S_9]$=false). The KILL processing determines that all definition vector positions in the data vector remain false. At this time, the GEN processing performed for the $S_4$ vector position determines that the data vector position for $S_4$ (i.e., $D[S_4]$) is equal to P. The new result is then written into the data vector position for $S_4$.

At operation $S_5$, the GEN, KILL, and TEST rules are applied to the respective vector positions of the data vector only. The KILL processing determines that the data vector position for $S_4$ (i.e., $D[S_4]$) is P and the data vector position for each of $S_5$ and $S_9$ remains false. The GEN processing determines that the data vector position for $S_5$ becomes Q. The TEST processing determines that there is no dependency between the $S_4$ and $S_5$ operations. The data and use vectors are then updated.

At operation $S_9$, the KILL processing determines $D[S_4]$ is P, $D[S_5]$ is R, and $D[S_9]$ remains false. The GEN processing determines that the data vector position for $S_9$ becomes S. The TEST processing determines that there is no dependency between the $S_4$ and $S_9$ operations. The TEST processing also determines that there exists an output dependency between the $S_5$ and $S_9$ operations. The data and use vectors are then updated.

Because operations $S_{11}$ is a use operation for variable x, there will be no KILL processing. The GEN processing determines that the use vector position for $S_{11}$ is T2. The TEST processing determines that there is a flow dependency between the $S_4$ and $S_{11}$ operations and between the $S_5$ and $S_{11}$ operations. The TEST processing also determines that there is no dependency between the $S_9$ and $S_{11}$ operations.

Figure 18:
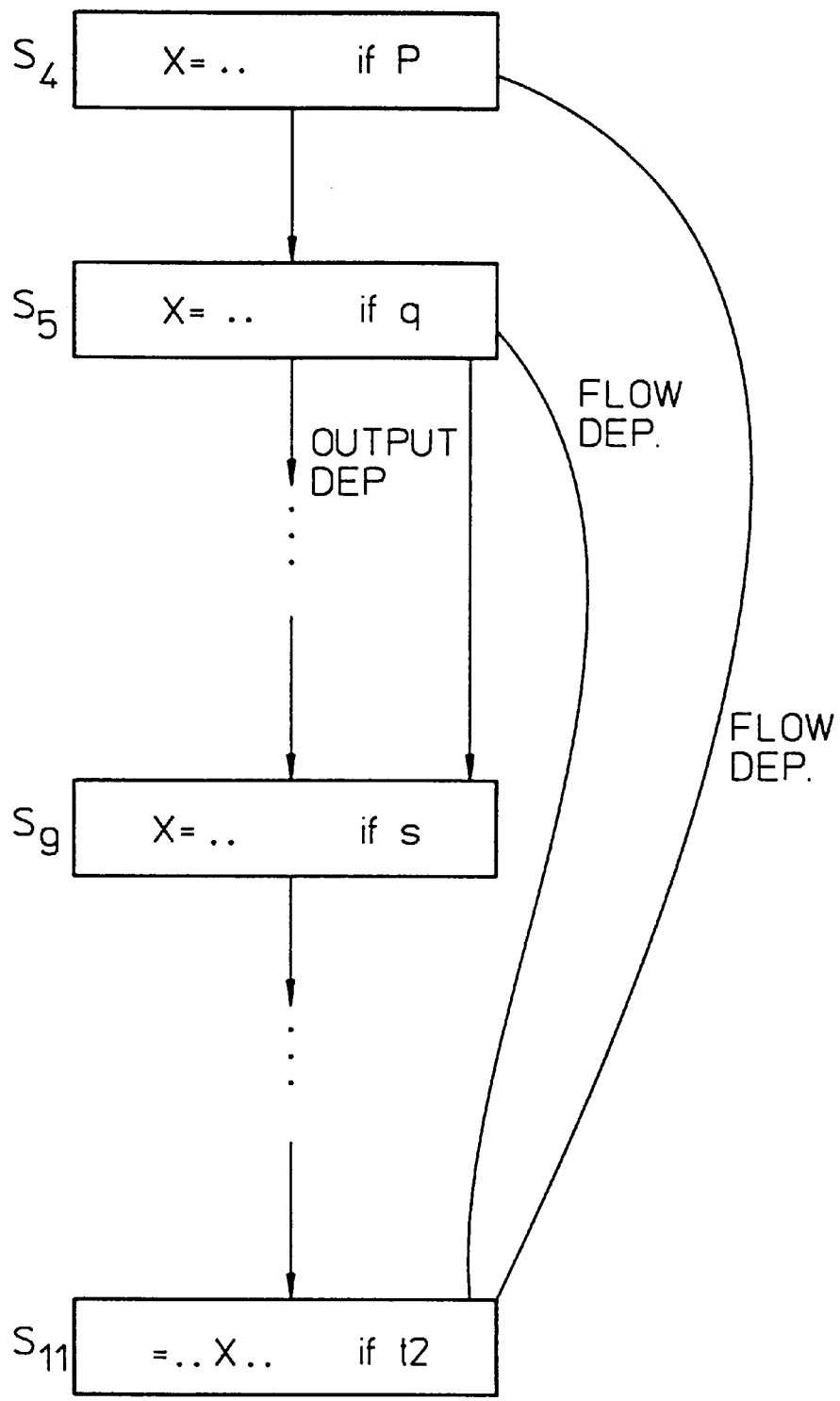
FIG. 18 partly shows the annotated control flow graph for the variable x of the predicated code of FIG. 10.

The data dependencies are then annotated back into the code, thus obtaining an annotated control flow graph for the variable x (see FIG. 18). The annotated code can then be scheduled and register allocated by the scheduler 230 (FIG. 7) and FIG. 19 shows the scheduled code of the code of FIG. 10.

As can be seen from FIGS. 18 and 19, because the $S_4$ and $S_5$ operations have no dependency, they are scheduled together in the same cycle. Similarly, because the $S_9$ and $S_{11}$ operations have no dependency, they are scheduled together in the same cycle. The result is that the code can be executed in only three cycles, as compared to five cycles (see FIG. 3) for the same code using the prior art compiler.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A compiler that compiles a predicated code, comprising:
    (A) a data flow analysis system that manipulates and queries predicate expressions of the predicated code to analyze data flow properties of the predicated code, wherein the data flow analysis system approximates results of the predicate expressions of the predicated code while manipulating the predicate expressions such that manipulation of the predicate expressions is both accurate and efficient.

2. The compiler of claim 1, further comprising a predicate query system that stores predicate relations of the predicated code such that the data flow analysis system queries the predicate query system to manipulate the predicate expressions of the predicated code.

3. The compiler of claim 1, wherein the data flow analysis system is coupled between a predicate conversion system of the compiler and a scheduler and register allocator of the compiler, wherein the data flow analysis system annotates the predicated code with the analyzed data flow properties.

4. The compiler of claim 3, wherein the scheduler and register allocator is directly coupled to the data flow analysis system to receive the annotated predicated code and does not receive the predicated code from the predicate conversion system that converts a source code into the predicated code.

5. A predicate-sensitive analyzer for a compiler that compiles a predicated code, comprising:
    (A) a predicate query system that stores local and global predicate relations of the predicated code and answers queries regarding the local and global predicate relations.

6. The predicate-sensitive analyzer of claim 5, further comprising
    (B) a scanner that determines the local predicate relations of the predicated code;
    (C) a builder that determines the global predicate relations of the predicated code.

7. The predicate-sensitive analyzer of claim 6, wherein the scanner further comprises:
    (I) a translator that translates predicates of the predicated code into sequential static single assignment form;
    (II) a normalizer that normalizes compare conditions of the predicated code and scans the normalized predicated code to determine the local predicate relations.

8. The predicate-sensitive analyzer of claim 7, wherein the normalizer also detects equivalent and complimentary predicates in the predicated code.

9. The predicate-sensitive analyzer of claim 6, wherein the builder determines the global predicate relations of the predicated code by building a partition graph from the local predicate relations and completing the partition graph by providing a single common ancestor that forms a unique root node for the partition graph.

10. The predicate-sensitive analyzer of claim 6, wherein the predicate query system further comprises
    (a) a first set of instructions that examines the completed partition graph to determine whether a first predicate of the predicated code is disjoint from a second predicate of the predicated code;
    (b) a second set of instructions that examines the completed partition graph to determine whether the first predicate of the predicated code is subset of the second predicate of the predicated code.

11. The predicate-sensitive analyzer of claim 10, wherein the predicate query system further comprises
    (c) a third set of instructions that examines the completed partition graph to add the first predicate of the predicated code to a predicate expression of the predicated code;
    (d) a fourth set of instructions that examines the completed partition graph to subtract the first predicate of the predicated code to the predicate expression of the predicated code.

12. The predicate-sensitive analyzer of claim 5, further comprising a data flow analysis system coupled to the predicate query system and coupled to receive the predicated code to analyze data flow properties of the predicated code, wherein the data flow analysis system queries the predicate query system for the predicate relations of the predicated code when analyzing the data flow properties of the predicated code.

13. The predicate-sensitive analyzer of claim 12, wherein the data flow analysis system approximates results of predicate expressions of the predicated code while manipulating the predicate expressions such that manipulation of the predicate expressions is both accurate and efficient.

14. In a compiler system that compiles a predicated code, a method of providing predicate-sensitive data flow analysis, comprising the steps of:
    (A) manipulating predicates and predicate expressions of the predicated code to analyze data flow properties of the predicated code, wherein the step (A) further comprises the step of approximating results of the predicate expressions being manipulated such that the approximated results can be accurate and efficiently obtained;
    (B) sending queries about the predicates and predicate expressions of the predicated code to a predicate query system that stores predicate relations of the predicated code when manipulating the predicates and predicate expressions;

(C) receiving results of the queries from the predicate query system about the predicates and predicate expressions.

15. The method of claim 14, wherein the step (C) further comprises the step of annotating the predicated code with the analyzed data flow properties.

16. The method of claim 14, further comprising the step of scheduling and register-allocating the annotated predicated code such that compilation of the predicated code is optimized.

17. In a compiler that compiles a predicated code, a method for analyzing the predicated code, comprising the steps of:

(A) determining local predicate relations of the predicated code;

(B) determining global predicate relations of the predicated code;

(C) storing the local and global predicate relations of the predicated code in a predicate query system such that the local and global predicate relations can be queried during data flow analysis of the predicated code.

18. The method of claim 17, wherein the step (A) further comprises the steps of (I) translating predicates of the predicated code into sequential static single assignment form;

(II) normalizing compare conditions of the predicated code and scanning the normalized predicated code to determine the local predicate relations.

19. The method of claim 17, wherein the step (B) further comprises the steps of (i) building a partition graph from the local predicate relations;

(ii) completing the partition graph by providing a single common ancestor that forms a unique root node for the partition graph.

20. The method of claim 17, wherein the step (C) further comprises the steps of (a) examining the completed partition graph to determine whether a first predicate of the predicated code is disjoint from a second predicate of the predicated code;

(b) examining the completed partition graph to determine whether the first predicate of the predicated code is subset of the second predicate of the predicated code;

(c) examining the completed partition graph to add the first predicate of the predicated code to a predicate expression of the predicated code;

(d) examining the completed partition graph to subtract the first predicate of the predicated code from the predicate expression of the predicated code.

* * * * *